(12) United States Patent
Poppe

(10) Patent No.: US 9,713,959 B2
(45) Date of Patent: Jul. 25, 2017

(54) MOTOR VEHICLE HAVING A HYBRID DRIVE

(71) Applicant: Dr. Ing. h.c. F. Porsche Aktiengesellschaft, Stuttgart (DE)

(72) Inventor: Frank Poppe, Kirchheim-Teck (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 14/813,393

(22) Filed: Jul. 30, 2015

(65) Prior Publication Data

US 2016/0031327 A1 Feb. 4, 2016

(30) Foreign Application Priority Data

Jul. 31, 2014 (DE) .................. 10 2014 110 869

(51) Int. Cl.
| | | |
|---|---|---|
| B60T 13/74 | (2006.01) | |
| B60L 7/26 | (2006.01) | |
| B60T 11/20 | (2006.01) | |
| B60T 13/58 | (2006.01) | |
| B60T 13/68 | (2006.01) | |
| B60T 1/10 | (2006.01) | |
| B60T 7/04 | (2006.01) | |

(Continued)

(52) U.S. Cl.
CPC ........ B60L 7/26 (2013.01); B60L 7/18 (2013.01); B60T 1/10 (2013.01); B60T 7/042 (2013.01); B60T 11/20 (2013.01); B60T 13/58 (2013.01); B60T 13/586 (2013.01); B60T 13/686 (2013.01); F16D 61/00 (2013.01)

(58) Field of Classification Search
CPC ........ B60T 11/20; B60T 13/58; B60T 13/586; B60T 13/686; B60T 1/10; B60T 7/042; F16D 61/00; B60L 7/18; B60L 7/26
See application file for complete search history.

(56) References Cited

U.S. PATENT DOCUMENTS

| | | | |
|---|---|---|---|
| 2011/0006594 A1* | 1/2011 | Ganzel | B60T 8/4077 303/10 |
| 2011/0291469 A1* | 12/2011 | Drumm | B60T 8/4077 303/2 |
| 2012/0326492 A1* | 12/2012 | Mayer | B60T 8/4081 303/9.72 |

FOREIGN PATENT DOCUMENTS

| | | |
|---|---|---|
| DE | 102010008018 | 8/2011 |
| DE | 102011008928 | 7/2012 |

OTHER PUBLICATIONS

German Search Report for German Application No. 10 2014 110 869.8 mailed May 4, 2015 including partial translation.

* cited by examiner

*Primary Examiner* — Melody Burch
(74) *Attorney, Agent, or Firm* — RatnerPrestia

(57) ABSTRACT

Motor vehicle having a hybrid drive which includes at least one wheel which can be driven by an electric machine, wherein a recuperation device is provided which permits recuperation of energy in a recuperation phase during a braking process, wherein a brake system is provided with a pedal, at least one master brake cylinder and at least one wheel brake which fluidically activates the wheel brake on the basis of a movement of the pedal by a brake pressure, wherein a pressure-reducing valve device is provided which reduces the brake pressure in the recuperation phase, and wherein a compensator is provided for compensating a hydraulic effect of the pressure-reducing valve device, wherein in the effective range of the pressure-reducing valve device two master brake cylinders are provided whose pistons are rigidly coupled to one another via a connecting element.

6 Claims, 2 Drawing Sheets

(51) Int. Cl.
*B60L 7/18* (2006.01)
*F16D 61/00* (2006.01)
*B60T 8/42* (2006.01)

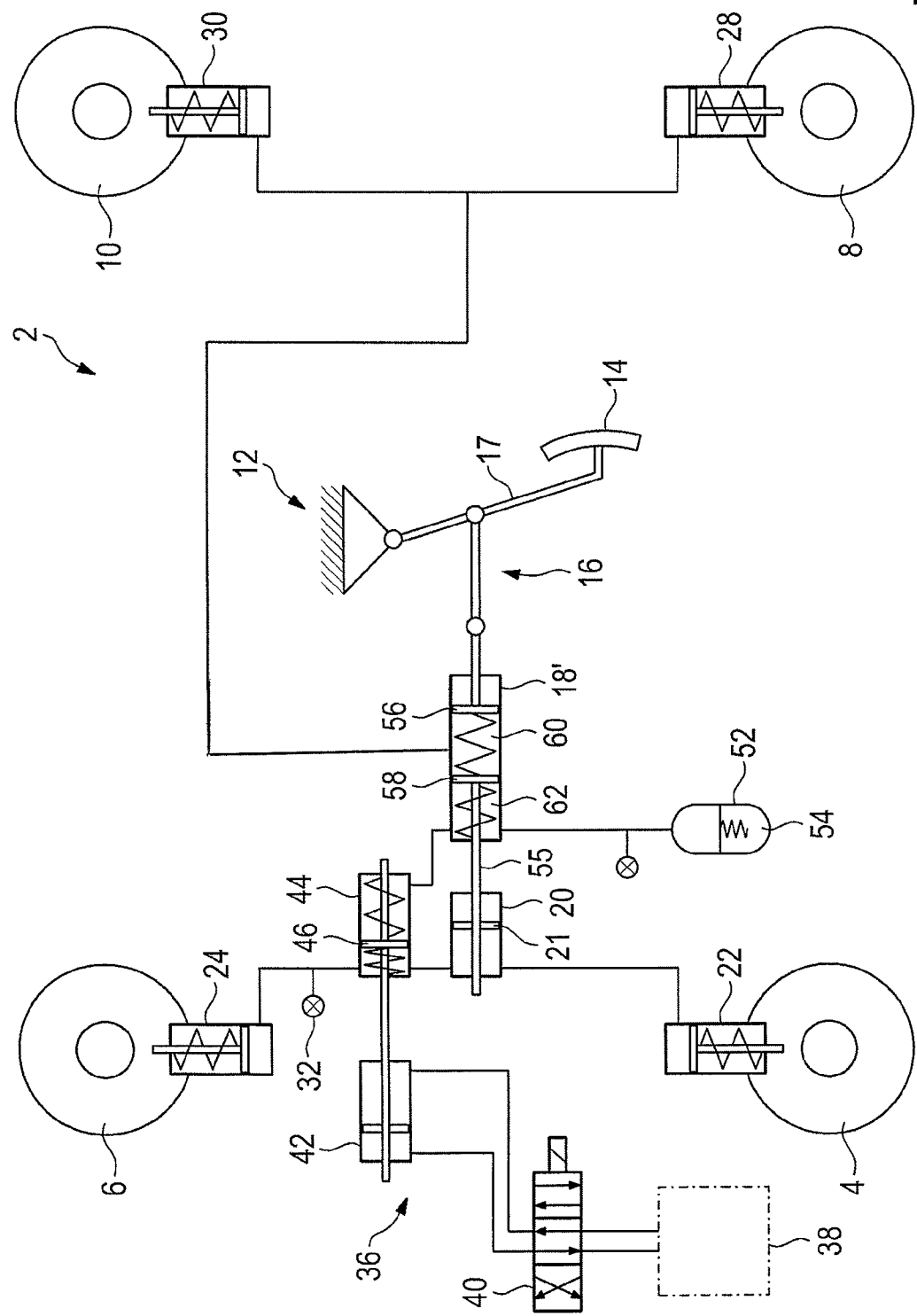

MOTOR VEHICLE HAVING A HYBRID DRIVE

CROSS-REFERENCE TO RELATED APPLICATIONS

This application claims priority under 35 U.S.C. §119 of German Patent Application No. 10 2014 110 869.8, filed Jul. 31, 2014, which is incorporated by reference herein in its entirety

FIELD OF THE INVENTION

The invention relates to a motor vehicle having a hybrid drive which comprises at least one wheel which can be driven by an electric machine, wherein a recuperation device is provided which permits recuperation of energy in a recuperation phase during a braking process, wherein a brake system is provided with a pedal, at least one master brake cylinder and at least one wheel brake which fluidically activates the wheel brake on the basis of a movement of the pedal by means of a brake pressure, wherein a pressure-reducing valve device is provided which reduces the brake pressure in the recuperation phase, and wherein a compensator is provided for compensating a hydraulic effect of the pressure-reducing valve device.

BACKGROUND OF THE INVENTION

DE 10 2010 008 018 A1, which is incorporated by reference herein, discloses a related motor vehicle. In this context, a front axle is driven by an electric machine and the rear axle by an internal combustion engine. In the present invention, such an embodiment of the motor vehicle is also assumed, but it is not restricted to such a drive system. In the case of a braking process, the electric machine which acts on the front axle can also be used as a generator, as a result of which braking energy is converted into electrical energy and the hydraulic brake system is relieved of loading. In this context it is known to provide a pressure-reducing valve device in order to be able to adjust the hydraulic brake system during the recuperation phase. It has proven disadvantageous here that the driver experiences this adjustment process as disruptive via a brake pedal reaction. In order to avoid this disadvantage, DE 10 2010 008 018 A1 discloses using what is referred to as a compensator which counteracts the hydraulic effect of the pressure-reducing valve device. However, this known solution has the disadvantage that it can be applied only to a brake system with a balance beam system and that owing to the purely hydraulic method of operation a deceleration of the effect of the pressure-reducing valve device, albeit minimal, still occurs.

SUMMARY OF THE INVENTION

Described herein is a motor vehicle which has a hybrid drive and which avoids the abovementioned disadvantages in a cost-effective and simple way. In the effective range of the pressure-reducing valve device, two master brake cylinders are provided whose pistons are rigidly coupled to one another via a connecting element. In this way, it is easily and directly ensured that the pistons of the master brake cylinders, in this case for the front axles, also remain in the actuated position in the recuperation phase.

In a first embodiment, a balance beam is provided which is operatively connected to the pedal and adjoined in each case by a master brake cylinder. This embodiment is suitable in particular for sports cars. In a second embodiment which is advantageous, in particular, for road-approved passenger cars, a tandem slave cylinder is provided as the first master brake cylinder.

The first master brake cylinder is advantageously embodied as a compensator and is fluidically connected to an equalization chamber. The equalization chamber can have a spring element, as a result of whose configuration the volume rigidity of the brake hydraulics is identical to that of the equalization chamber.

The pressure-reducing valve device may advantageously comprise a hydraulic actuator and a balance cylinder which comprises a balance piston which is displaceably arranged in order to accommodate a hydraulic volume and to make available two hydraulic chambers, wherein the first hydraulic chamber is fluidically connected to the first master brake cylinder and the second hydraulic chamber is fluidically connected to the second master brake cylinder. The hydraulic actuator is advantageously fluidically connected to a separate hydraulic unit via a 4/3-way servo valve here. It is alternatively also possible that the hydraulic actuator is capable of being actuated via a central hydraulic unit.

BRIEF DESCRIPTION OF THE DRAWINGS

The invention will be explained in more detail with reference to a drawing, in which:

FIG. 2 shows a hydraulic circuit diagram of a motor vehicle having a second embodiment of a brake system.

DETAILED DESCRIPTION OF THE INVENTION

Figure 1:
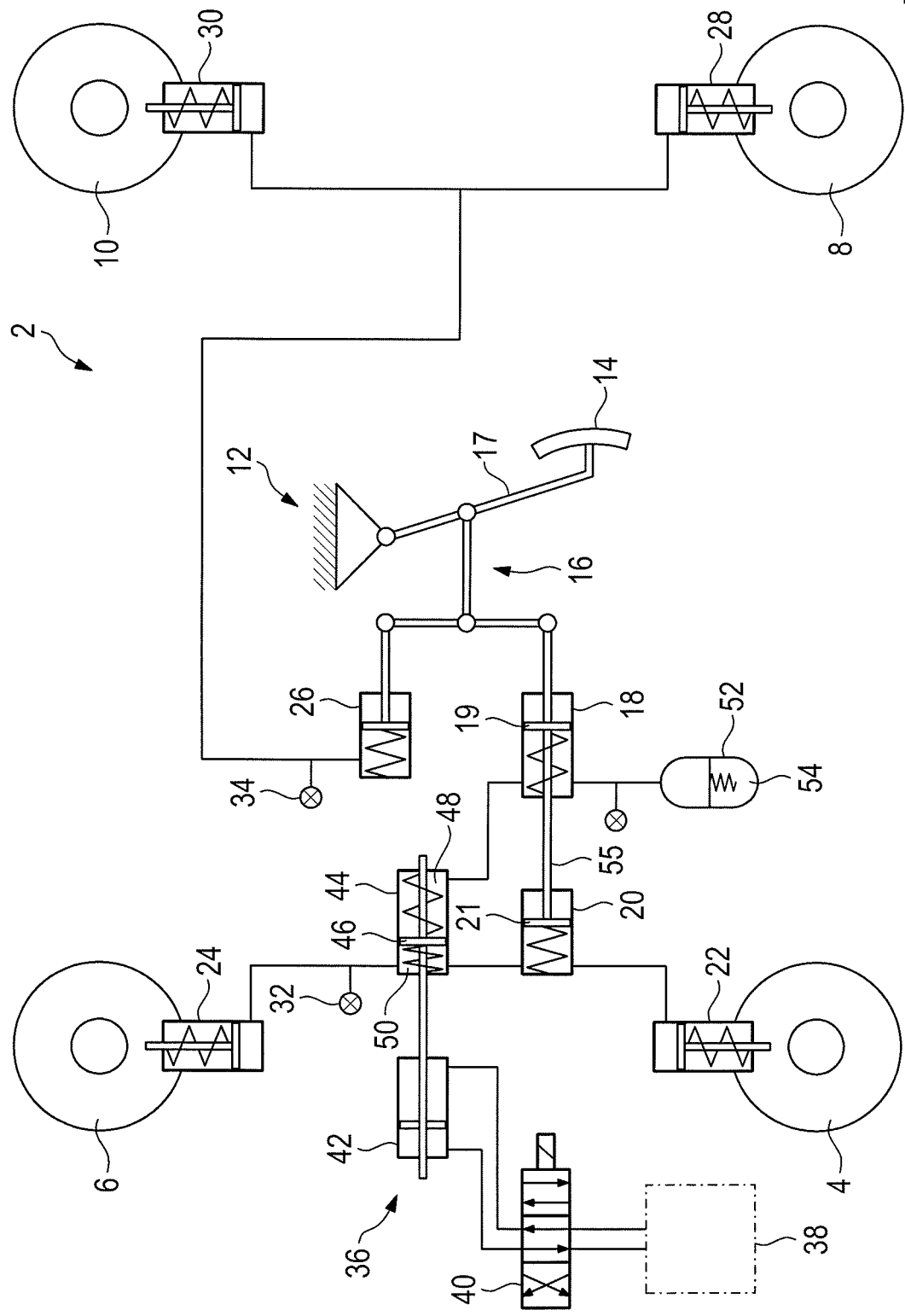
FIG. 1 shows a hydraulic circuit diagram of a motor vehicle having a first embodiment of a brake system.

FIG. 1 shows a motor vehicle 2 in the form of a hydraulic circuit diagram. Two front wheels 4, 6 are provided on a front axle (not illustrated further). Rear wheels 8, 10 are correspondingly arranged on a rear axle (not illustrated further). The motor vehicle 2 can also be referred to as a hybrid vehicle and has an electric machine (not illustrated further) which is operatively connected to the front axle and has an internal combustion engine (not illustrated further) which is operatively connected to the rear wheel axle. It should be clear that there are a large number of what are referred to as hybrid drives which all fall within the scope of protection of the invention.

In this context, the electric machine carries out, on the one hand, the function of an electric motor when the wheels 4, 6 of the front axle are driven by the electric machine. Furthermore, in a recuperation phase in which the electric machine acts as a generator, said electric machine can convert two generated quantities of braking energy into electrical energy during the braking of the motor vehicle. The recovery of energy during the braking of the motor vehicle 2 is also referred to as recuperation. The energy which is recovered during the braking can be stored in batteries or capacitors.

In addition to the recuperation as a braking function, the motor vehicle 2 comprises a hydraulic brake system 12. In this context, a pedal 14 is provided which acts on what is referred to as a balance beam 16. This balance beam 16 serves to set a brake pressure distribution between the front axle, and therefore between the front wheels 4 and 6, and the rear axle, or the rear wheels 8 and 10. With respect to the brake pressure distribution to the front wheels 4, 6, the balance beam 16 is adjoined by a first and a second master brake cylinder 18, 20 with respective pistons 19, 21, wherein the second master brake cylinder 20 is fluidically connected to wheel brakes 22, 24 which are arranged on the front wheels 4, 6. The opposite side of the balance beam 16 is adjoined by a third master brake cylinder 26 which is fluidically connected in known fashion to wheel brakes 28, 30 of the rear wheels 8, 10. The brake pressure which acts on the front wheels 4, 6 and the brake pressure which acts on the rear wheels 8, 10 are monitored in a known fashion by means of sensors 32, 34.

As already described, the electric machine is operatively connected to the front axle of the motor vehicle 2 and acts in a recuperation phase as a generator which converts the generated braking energy into electrical energy during braking. In order then to reduce the brake pressure of the brake system 12 in the recuperation phase, a pressure-reducing valve device 36 is provided for reducing in a corresponding way the brake pressure which is present at the wheel brakes 22, 24 of the front wheels 4, 6. The pressure-reducing valve device 36 is composed in the present exemplary embodiment of a separate hydraulic unit 38 which supplies the pressure. The hydraulic unit 38 is connected to a hydraulic actuator 42 via a 4/3-way servo valve 40. The brake pressure can be increased or reduced by means of this hydraulic actuator 42, with the result that the brake pressure in the recuperation phase can be adapted in the effective region of the pressure-reducing valve device 36, in this case the front axle. For this purpose, the actuator 42 acts on a balance cylinder 44 which comprises a balance piston 46 which is displaceably arranged in such a way that a hydraulic volume can be made available in two hydraulic chambers 48, 50. The first hydraulic chamber 48 is fluidically connected here to the first master brake cylinder 18, and the second hydraulic chamber 50 is fluidically connected to the second master brake cylinder 20. The first master brake cylinder 18 is furthermore fluidically connected to an equalization chamber 52, wherein the equalization chamber 52 has a spring element 54 in order to ensure that the volume rigidity of the brake hydraulics is identical in the region of the front axle to that of the equalization chamber 52. In this way, the first master brake cylinder 18 acts as a compensator which avoids a movement of the brake pedal 14 which is experienced as disruptive when the pressure-reducing valve device 36 is used. For this purpose, the piston 19 of the first master brake cylinder 18 is connected directly to the piston 21 of the second mater brake cylinder 20 via a rigid connecting rod 55.

The description of the brake system 12 is restricted below to the explanation of the effective region of the pressure-reducing valve device, that is to say the front axle. As long as recuperation of the electric machine does not take place, the brake system 12 acts as a conventional brake system, wherein the braking process is triggered via the pedal 14, and the brake pressure is transmitted to the second brake pressure cylinder 20 via the balance beam 16 and the first master brake cylinder 18, said brake pressure cylinder 20 being fluidically connected to the wheel brakes 22, 24 in a known fashion. The wheel brakes 28, 30 are fluidically connected to the third master brake cylinder 26.

If a recuperation phase is then initiated, this must inevitably bring about a reduction in the brake pressure in the region of the front axle. In this context, the balance piston 46 is shifted to the right by the hydraulic actuator 42, which brings about a drop in pressure in the first hydraulic chamber 50 and therefore also at the wheel brakes 22, 24. In return an increase in pressure occurs in the first hydraulic chamber 48, which is passed on to the equalization chamber 52 and absorbed by the spring element 54, as a result of which the volume rigidity and therefore the positions of the pistons 19, 21 of the master brake cylinders 18, 20 remain the same. This avoids the disruptive reaction effect.

FIG. 2 shows the hydraulic circuit diagram of a second embodiment of a brake system 12 such as is customarily used in road-approved passenger cars. Instead of a balance beam 16 (see FIG. 1 in this respect) a simple lever arrangement 17, which is operatively connected to a first master brake cylinder 18', is used here. The first master brake cylinder 18' is embodied here as a tandem slave cylinder which has two pistons 56, 58 which form two hydraulic chambers 60, 62. In this context, the hydraulic chamber 60 is fluidically assigned to the wheel brakes 28, 30 of the rear wheel axle. The hydraulic chamber 62 is comparable to the hydraulic chamber of the first master brake cylinder 18 in FIG. 1 and is responsible here, together with the second master brake cylinder 21, for the brake pressure which acts on the wheel brakes 22, 24. Consequently the hydraulic space 62 of the first master brake cylinder 18' is also considered to be a compensator function. The second piston 58 is rigidly coupled to the piston 21 of the second master brake cylinder, again via the connecting element 55.

The reduction in brake pressure in a recuperation phase occurs as described in FIG. 1.

What is claimed is:

1. A motor vehicle having a hybrid drive which comprises at least one wheel which can be driven by an electric machine, said motor vehicle comprising:
    a brake system with a pedal and two master brake cylinders which fluidically activate wheel brakes on the basis of a movement of the pedal, wherein pistons of the two master brake cylinders are rigidly coupled to one another via a connecting element,
    a recuperation device that permits recuperation of energy in a recuperation phase during a braking process, the recuperation device comprising a pressure-reducing valve device that reduces the brake pressure in the recuperation phase, a first master brake cylinder of the two master brake cylinders embodied as a compensator for compensating a hydraulic effect of the pressure-reducing valve device, and an equalization chamber,
    wherein the pressure-reducing valve device comprises a hydraulic actuator and a balance cylinder hydraulically connected to the hydraulic actuator by a balance piston, the balance piston dividing two hydraulic chambers within the balance cylinder,
    wherein a first hydraulic chamber of the two hydraulic chambers is fluidically connected to the first master brake cylinder of the two master brake cylinders, and a second hydraulic chamber of the two hydraulic chambers is fluidically connected to a second master brake cylinder of the two master brake cylinders,
    wherein the first master brake cylinder of the two master brake cylinders is also fluidly connected to the equalization chamber,
    wherein fluid delivered either into or from the hydraulic actuator during the recuperation phase biases the balance piston, which causes fluid to be delivered from the first hydraulic chamber of the balance cylinder into the first master brake cylinder and then into the equalization chamber.

2. The motor vehicle as claimed in claim 1, further comprising a balance beam which is operatively connected to the pedal and adjoined by the master brake cylinders.

3. The motor vehicle as claimed in claim 1, wherein a tandem slave cylinder is provided as the first master brake cylinder of the two master brake cylinders.

4. The motor vehicle as claimed in claim 1, wherein the equalization chamber has a spring element.

5. A motor vehicle having a hybrid drive which comprises at least one wheel which can be driven by an electric machine, said motor vehicle comprising:

a brake system with a pedal and at least two master brake cylinders which fluidically activate wheel brakes on the basis of a movement of the pedal, wherein pistons of the at least two master brake cylinders are rigidly coupled to one another via a connecting element, a recuperation device that permits recuperation of energy in a recuperation phase during a braking process, the recuperation device comprising a pressure-reducing valve device that reduces the brake pressure in the recuperation phase, and a first master brake cylinder of the at least two master brake cylinders, which is embodied as a compensator for compensating a hydraulic effect of the pressure-reducing valve, wherein the pressure-reducing valve device comprises a hydraulic actuator and a balance cylinder which comprises a balance piston which is displaceably arranged in order to accommodate a hydraulic volume and to make available two hydraulic chambers, wherein a first hydraulic chamber of the two hydraulic chambers is fluidically connected to the first master brake cylinder of the at least two master brake cylinders and the second hydraulic chamber of the two hydraulic chambers is fluidically connected to a second master brake cylinder of the at least two master brake cylinders, wherein the hydraulic actuator is fluidically connected to a separate hydraulic unit via a 4/3-way servo valve.

6. The motor vehicle as claimed in claim 1, wherein the hydraulic actuator is capable of being actuated via a central hydraulic unit.

* * * * *